US012617167B2

(12) United States Patent
Pialot et al.

(10) Patent No.: US 12,617,167 B2
(45) Date of Patent: May 5, 2026

(54) PNEUMATIC TIRE CURING METHOD USING A CURING MEMBRANE COMPRISING THREE DRAINAGE AREAS ARRANGED IN INCREASING ORDER OF DEPTH

(71) Applicant: Compagnie Generale Des Etablissements Michelin, Clermont-Ferrand (FR)

(72) Inventors: Frederic Pialot, Clermont-Ferrand (FR); Jose Merino Lopez, Clermont-Ferrand (FR); Alain Faugeras, Clermont-Ferrand (FR)

(73) Assignee: Compagnie Generale Des Etablissements Michelin

( * ) Notice: Subject to any disclaimer, the term of this patent is extended or adjusted under 35 U.S.C. 154(b) by 1004 days.

(21) Appl. No.: 17/616,082

(22) PCT Filed: Jun. 2, 2020

(86) PCT No.: PCT/EP2020/065215
§ 371 (c)(1),
(2) Date: Dec. 2, 2021

(87) PCT Pub. No.: WO2020/245115
PCT Pub. Date: Dec. 10, 2020

(65) Prior Publication Data
US 2022/0314564 A1      Oct. 6, 2022

(30) Foreign Application Priority Data
Jun. 6, 2019    (FR) ...................................... 1906013

(51) Int. Cl.
*B29D 30/06* (2006.01)

(52) U.S. Cl.
CPC .. *B29D 30/0654* (2013.01); *B29D 2030/0658* (2013.01)

(58) Field of Classification Search
CPC ........ B29D 30/0654; B29D 2030/0655; B29D 2030/0658; B29D 2030/0659; B60C 2013/026; B60C 2019/008
(Continued)

(56) References Cited

U.S. PATENT DOCUMENTS

2012/0073725 A1*   3/2012   Lo Presti .................. B60C 5/14
152/450

FOREIGN PATENT DOCUMENTS

CN       102615750 A      8/2012
CN       108381832 A      8/2018
(Continued)

OTHER PUBLICATIONS

Chen X, CN-102615750-A, updated machine translation. (Year: 2012).*

(Continued)

*Primary Examiner* — Sedef E Paquette
(74) *Attorney, Agent, or Firm* — Dickinson Wright PLLC

(57)      ABSTRACT

The method includes a step of deploying a curing membrane against an interior surface of the tire. The curing membrane has a contact surface with a drainage structure which comprises air-discharge channels and which is subdivided into a first drainage region, a second drainage region, and a third drainage reason. The first drainage region is pressed intimately against a crown region of the tire, the second drainage region is pressed intimately against a sidewall region of the tire, and the third drainage region is pressed intimately against a bead region of the tire. A mean depth of the channels of the third drainage region is strictly greater than a mean depth of the channels of the second drainage
(Continued)

region, which is itself strictly greater than a mean depth of
the channels of the first drainage region.

19 Claims, 4 Drawing Sheets

(58) Field of Classification Search
USPC ........................................................ 425/28.1
See application file for complete search history.

(56) References Cited

FOREIGN PATENT DOCUMENTS

| | | | | |
|---|---|---|---|---|
| JP | 2005280259 | A | * | 10/2005 |
| JP | 2008012751 | A | | 1/2008 |
| JP | 2015054418 | A | * | 3/2015 |
| WO | 2009078317 | A1 | | 6/2009 |

OTHER PUBLICATIONS

Ji Y J, JP-2005280259-A, machine translation. (Year: 2005).*
Shirokibara Masafumi, JP-2015054418-A, machine translation. (Year:
2015).*

* cited by examiner

A-A

B-B

C-C

PNEUMATIC TIRE CURING METHOD USING A CURING MEMBRANE COMPRISING THREE DRAINAGE AREAS ARRANGED IN INCREASING ORDER OF DEPTH

CROSS-REFERENCE TO RELATED APPLICATION

This application claims priority to and the benefit of PCT Patent Application No. PCT/EP2020/065215 filed on 2 Jun. 2020, entitled "PNEUMATIC CURING METHOD USING A CURING MEMBRANE COMPRISING THREE DRAINAGE AREAS ARRANGED IN INCREASING ORDER OF DEPTH," and French Patent Application No. FR1906013, filed on 6 Jun. 2019, entitled "PNEUMATIC CURING METHOD USING A CURING MEMBRANE COMPRISING THREE DRAINAGE AREAS ARRANGED IN INCREASING ORDER OF DEPTH".

BACKGROUND

1. Field

The present disclosure relates to the field of methods for manufacturing tires, and more particularly the field of methods for curing pneumatic tires.

2. Related Art

It is known practice to obtain a tire by first of all producing a green tire, of toroidal shape, and then by pressing said green tire against the walls of a curing mold using an inflatable curing membrane which serves to confer upon the tire the definitive shape thereof, and to vulcanize said tire.

The green tire is generally obtained by laying and winding onto a drum a plurality of components, usually including an airtight film known as an "inner liner", a carcass ply, rubber-based reinforcing plies reinforced with reinforcing threads, and a pair of annular bead wires intended to reinforce a bead region used for attaching the tire to a rim.

In order to mold the tire, a curing membrane is deployed against the interior surface of the green tire so as to press the exterior surface of said green tire against the walls of the mold, these themselves being arranged according to the definitive shape of the tire and provided with linings which correspond to the negative impression of the tread pattern.

Advantageously, the inflating of the curing membrane is performed using a pressurized heat-transfer fluid which is able not only to exert the pressure required for shaping the tire, but also to supply heat which contributes to the vulcanizing of said tire thus shaped.

Of course, it is necessary, when deploying the curing membrane, to remove the air that is initially trapped between said curing membrane and the interior surface of the green tire, this being so as to avoid the appearance of air pockets liable to lead to defects on the interior surface of the tire, which defects could prejudice the appearance, the performance, or even the cohesion of said tire.

In this regard, it is known practice to provide on the surface of the curing membrane a drainage structure comprising channels which form air discharge pathways, allowing the air to be removed to vents present for that purpose in the mold.

However, the person skilled in the art is then faced with contradictory requirements.

Specifically, in order to encourage effective drainage and removal of the air, the temptation would be, on the one hand, to cover the largest possible area of the curing membrane with channels, by providing the highest possible surface density of such channels, this being so as not to leave, on the interior surface of the green tire, regions that are not drained and, on the other hand, to provide said channels with the greatest possible depth, so as to have a high capacity for the flow of air through the cross section of the channels.

However, when the curing membrane is pressed intimately against the interior surface of the green tire, it is found that the airtight film or "inner liner" with which said green tire is lined, enters the channels and substantially adopts the shape of said channels. This then results in an increase in the developed surface area of said airtight film and therefore, through a plastic deformation phenomenon of the striction type, results in a reduction in the thickness of said airtight film. In order to avoid a weakening of the airtight film, and to thus guarantee the airtightness and longevity of the tire, it is therefore necessary to limit the surface irregularities of the curing membrane.

SUMMARY

The objectives assigned to the disclosure therefore seek to overcome the aforementioned disadvantages and to propose a novel curing method, together with a corresponding novel curing membrane, which ensures both effective removal of air during molding and a high and repeatable quality of the tire obtained.

In particular, the disclosure proposes to restrict as far as possible the depth of the channels of the drainage structure, so as to limit the inner liner striction effects.

The objectives assigned to the disclosure are achieved by means of a method for curing a tire during which a curing membrane is deployed against a green tire in order to bring a contact surface of said curing membrane to bear against an interior surface of said green tire and thus press an exterior surface of said green tire against the walls of a curing mold so as to obtain a tire which has a crown region forming an annular tread around a central axis Z, and, on each side of an equatorial plane normal to said central axis Z, a bead region for securing said tire to a rim, and a sidewall region connecting the crown region to the bead region, in which method the contact surface of the curing membrane is provided with a drainage structure which comprises air-discharge paths cut into the contact surface to a depth equal to or greater than 0.05 mm and referred to as "channels", said method being characterized in that said drainage structure is subdivided, at least on one side of the equatorial plane, into at least three drainage regions, these being a first drainage region which corresponds to a first annular portion of the contact surface, centered on the central axis, along which said contact surface will hug the crown region, a second drainage region which corresponds to a second annular portion of the contact surface, centered on the central axis, along which said contact surface will hug the sidewall region and the channels of which communicate with the channels of the first drainage region, and a third drainage region which corresponds to a third annular portion of the contact surface, centered on the central axis, along which said contact surface will hug the bead region and the channels of which communicate with the channels of the second drainage region, and in that the mean depth of the channels of the third drainage region, which is equal to the quotient of the volume occupied by the channels present in said drainage region by the surface area covered by these same channels in said drainage region, is strictly greater than the mean depth of the channels of the second drainage region, said mean depth of the channels of the second drainage region being itself strictly greater than the mean depth of the channels of the first drainage region.

Advantageously, the disclosure allows the drainage structure to be differentiated according to the tire region with which said drainage structure collaborates, and to give the channels a depth which overall increases progressively as the drainage regions succeed one another, and therefore from the crown region as far as the bead region of the tire, so that each drained region of the interior surface of the green tire is assigned just the necessary quantity of drainage channels to allow effective and progressive removal of the air while at the same time minimizing and rendering more uniform the deformations and corresponding variations in thickness of the inner liner.

In particular, the fact that the drainage regions are sub-divided, in successive slices of latitude extending in annular bands about the central axis, between imaginary lines referred to as "parallels" which are parallel to the plane referred to as the "equatorial plane" of the tire, which is normal to said central axis and which coincides with the equatorial plane of the curing membrane when the latter is in the deployed state, means that the drainage capacity of each of said drainage regions can be adapted, on the one hand according to the volume of air to be removed in each region of the tire and, on the other hand, according to the order in which each drainage zone, successively over the course of time as the curing membrane deploys, comes into contact with the tire region assigned to it.

Specifically, given the toroidal overall geometry of the tire, it is found that contact between the curing membrane and the green tire occurs first of all in the crown region and the bead regions and then in the sidewall region, ending in the hollow of said sidewall region of the tire which corresponds substantially to the shoulder, namely to the concave part of the sidewall region which marks the transition between the sidewall region and the crown region.

The drainage structure of the curing membrane therefore allows, in a first phase of deployment, the first drainage region, which has a relatively low mean channel depth, to be applied first of all to the crown region of the tire. This allows removal of air from the crown towards the shoulders and the sidewalls while causing only a very small amount of penetration of the inner liner into the channels of said first drainage region, owing to the fact that this penetration is dependent directly on the mean depth of the channels of the first drainage region. In that way, the molding leads to only a small reduction which, furthermore, is relatively uniform, in the thickness of the inner liner in said crown region. The mechanical strength and the airtightness of said inner liner are thus preserved.

At the same time, during this first phase, the third drainage region, which comes into contact with the bead regions but which has channels which on average are deeper than those of the first drainage region, creates, along the bead regions, a permanent outlet towards the vents of the mold for the air that is present in the sidewall regions (whether that air was initially present in said sidewall regions or whether it has come from the crown region, expelled therefrom by the membrane).

This same drainage structure specific to the disclosure then allows, in a second phase of deployment, the second drainage region to be applied against the sidewall regions, progressively, ending with the bottom of the hollow of said sidewall regions, near the shoulders.

During this time, in the course of said second phase, the channels of the third drainage region, because their depth is on average greater than that of the channels of the first and second drainage regions, maintain an open flow path along the bead regions as far as the vents of the mold, thus allowing the removal of the air trapped in the sidewall regions.

Here again, because of the relatively modest depth of the channels of the second drainage region, the pressing of said second drainage region against the interior surface of the tire in the sidewall regions does not give rise to any damaging deformation, or notably to any damaging loss in thickness, of the inner liner in the sidewall regions.

The multi-region drainage structure of the curing membrane according to the disclosure, and more preferably the drainage structure that can be described as a three-region structure insofar as said drainage structure preferably comprises three distinct types of drainage region, therefore allows the air to be removed progressively and completely towards the vents of the mold, successively from the crown region and then from the sidewall regions, and via the bead regions, by optimizing, both in space and in time, the volume of drainage channels that is assigned, at any given moment in the deployment of the curing membrane, to each respective region of the tire, and while at the same time causing no damage to the interior surface of the tire and more particularly no damage to the inner liner.

Furthermore, because the channels cut into the first and second drainage regions have depths that are relatively small in comparison with the thickness of the curing membrane, said channels do not weaken said curing membrane even in the regions in which said curing membrane is highly stressed and subjected to its greatest elastic extensions during deployment. In that way, it is possible to guarantee the longevity of said curing membrane, which maintains its integrity over a high number of molding cycles without cracking, breaking up or tearing.

Furthermore, the drainage structure according to the disclosure may advantageously be combined with a non-stick coating incorporated into the contact surface of the curing membrane and intended to facilitate the separation of the tire and the curing membrane after molding; such a combination makes it possible to achieve both removal of air during molding and easy detachment of the membrane after molding, even when electing not to use a mold dressing, i.e. an additional liquid substance aimed at facilitating mold stripping and which is usually sprayed into the green tire prior to molding.

BRIEF DESCRIPTION TO THE DRAWINGS

Further subjects, features and advantages of the disclosure will become apparent in more detail from reading the following description and with the aid of the appended drawings, which are provided purely by way of illustration and without limitation and in which.

DETAILED DESCRIPTION OF THE ENABLING EMBODIMENT

Figures 1A, 1B:
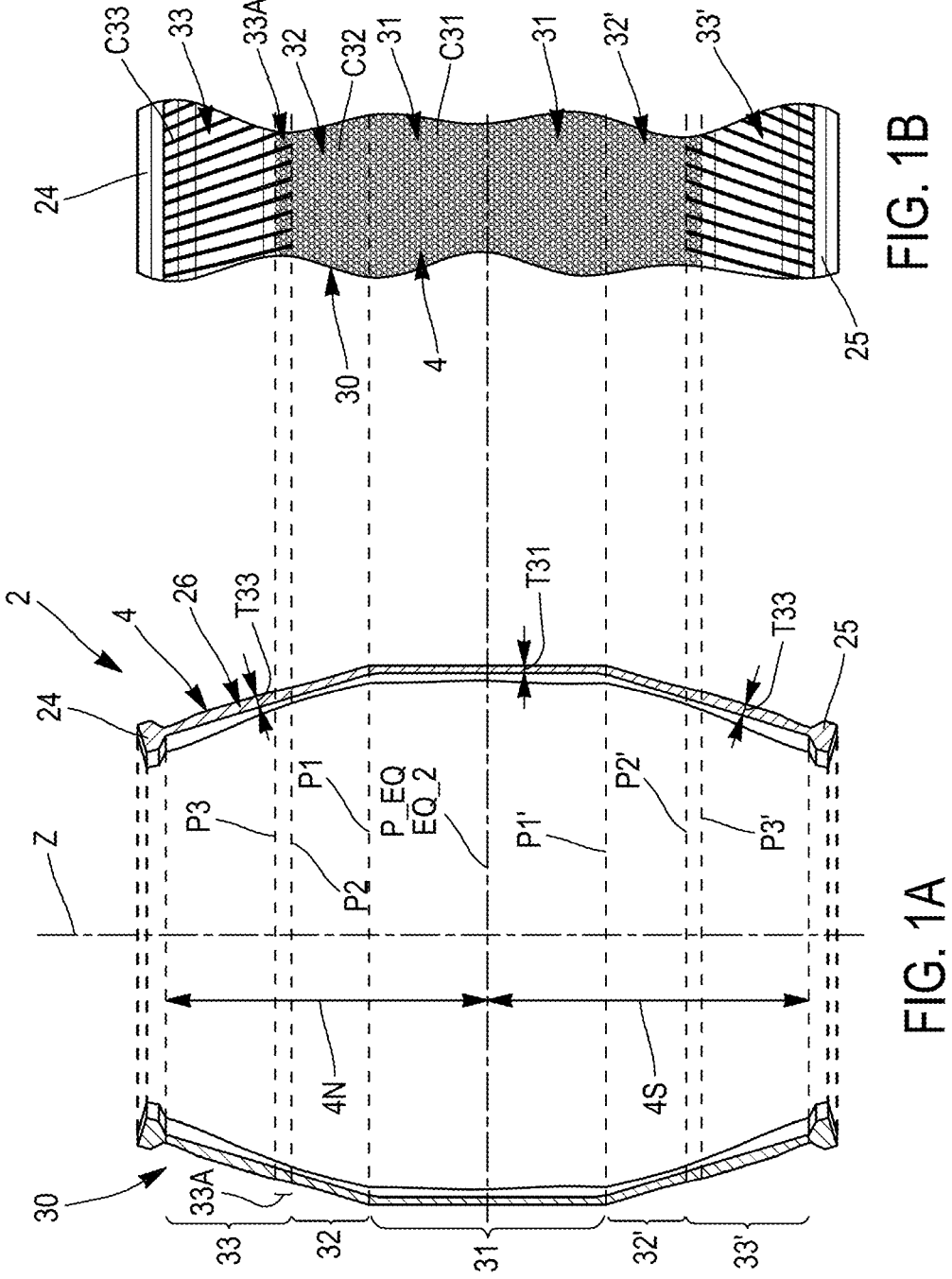
FIG. 1A illustrates, in a schematic face-on view, one example of a curing membrane according to the disclosure which, at rest, has a shape exhibiting symmetry of revolution generated by the revolution about the central axis of a basic section which is detailed in this same figure.
FIG. 1B illustrates, as a detailed view in projection, a portion of the contact surface of the curing membrane of FIG. 1, showing the distribution, in terms of latitude, from one foot of the membrane to the other, passing via the equatorial line thereof, of the first, second and third annular drainage regions.

The present disclosure relates to a method for curing a tire 1.

During the course of this method, a curing membrane 2 is deployed against a green tire 3 so as to bring a contact surface 4 of said curing membrane 2 to bear against an interior surface 5 of said green tire 3 and thus press an exterior surface 6 of said green tire against the walls 21 of a curing mold 7 so as to obtain a tire 1 which has a crown region 11, forming an annular tread about a central axis Z, and, on each side of an equatorial plane P_EQ normal to said central axis Z, a bead region 13 that allows said tire to be attached to a rim, and a sidewall region 12 which connects the crown region 11 to the bead region 13.

As indicated above, the green tire 3 will preferably be obtained by laying and winding onto a drum a plurality of components, preferably including an airtight film known as an "inner liner", one or more rubber-based reinforcing plies reinforced with reinforcing threads, preferably including a carcass ply and crown plies, and a pair of annular bead wires 14 intended to reinforce the bead region 13.

Figure 2:
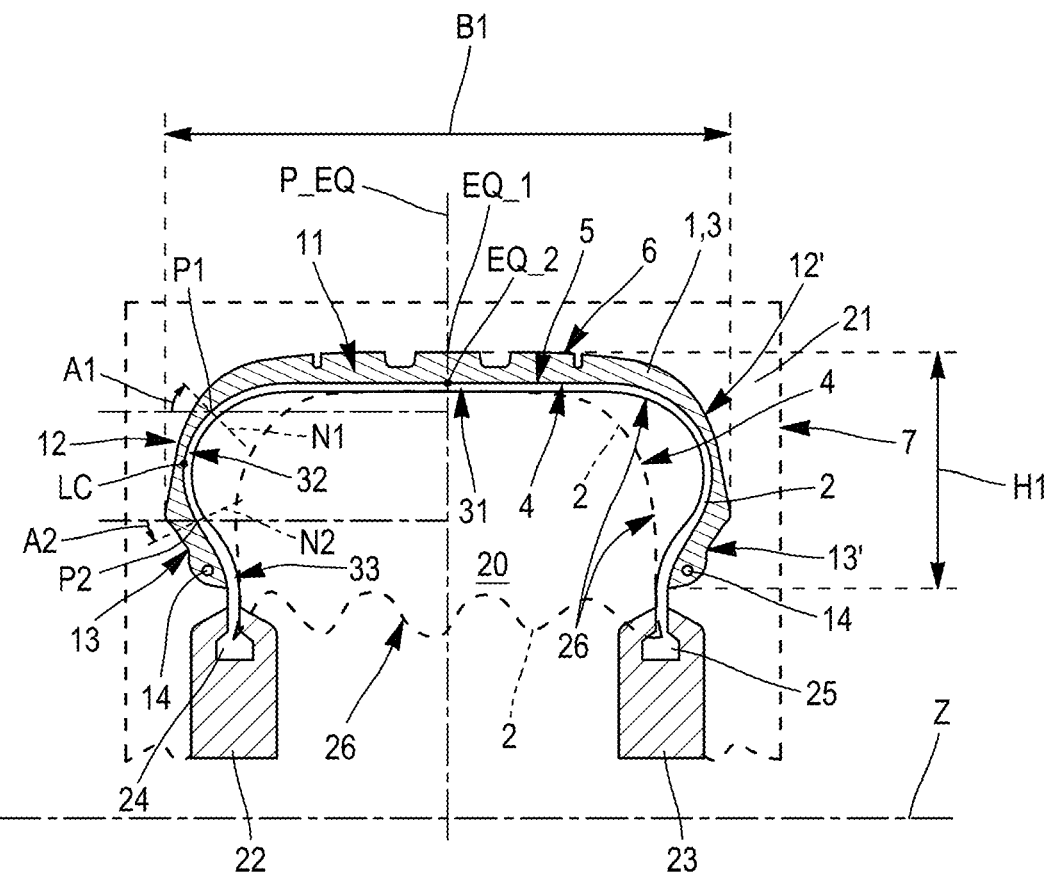
FIG. 2 is a schematic view of the progressive deployment of a membrane according to the disclosure against the bead, crown and sidewall regions of a tire, in cross section on a plane containing the central axis of the tire and of the membrane.

As visible in FIG. 2, the green tire 3, just like the finished tire 1, will have substantially a toroidal shape exhibiting symmetry of revolution, centered on the central axis Z, said shape comprising the crown region 11, two bead regions 13, 13', and two sidewall regions 12, 12'. In practice, the central axis Z will correspond to the future axis of rotation of the wheel into which the tire 1 is intended to be incorporated.

For the convenience of the description, the various regions and surfaces 5, 6 of the green tire 3 can be likened to the various regions 11, 12, 13 and corresponding surfaces of the finished tire 1.

By convention, "axial" refers to a direction parallel to, or even coincident with, the central axis Z, and "radial" refers to a direction perpendicular to said central axis Z.

By analogy with the topology of the globe that represents the Earth, the plane P_EQ normal to the central axis Z and that axially divides the tire 1 and, likewise axially divides the green tire 3, into two substantially symmetrical portions referred to as "hemispheres" will be referred to as the "equatorial plane".

By convention, the tire 1 or, similarly, the green tire 3, is considered to exhibit along the central axis Z an overall dimension referred to as the "section width" B1 which corresponds, as visible in FIG. 2, to the distance, measured parallel to the central axis Z, between, on the one hand, a first imaginary measurement plane which is normal to the central axis Z and which comes into tangential contact with the exterior surface 6 of said tire 1, or, respectively, with the exterior surface of the green tire 3, on a first side of said tire 1, in this case with the first sidewall region 12 and, on the other hand, a second imaginary measurement plane which is parallel to the first measurement plane and which comes into tangential contact with the exterior surface 6 of said tire 1, or, respectively, with the exterior surface of the green tire 3, on a second side of the tire, the opposite side to the first side, in this case with the second sidewall region 12'. By convention, the equatorial plane P_EQ is therefore situated axially halfway along said section width B1 so as to intersect the crown region 11 at the middle thereof.

The intersection of the equatorial plane P_EQ with the radially external surface of the tire 1 forms a line referred to as the "equatorial line" EQ_1, which is circular in shape, centered on the central axis Z, and situated axially in the middle of the crown region 11 and which in practice corresponds to the contour formed by all of the radially outermost points of the tire 1.

In what follows, the description of the disclosure will focus more particularly on one hemisphere of the tire comprising part (in this instance half) of the crown region 11, one sidewall region 12 and one bead region 13, and therefore on the corresponding hemisphere of the curing membrane 2. Of course, the description preferably applies mutatis mutandis to the other hemisphere and in particular to the second sidewall region 12' and the second bead region 13'.

FIG. 2 shows, in section on a sagittal plane containing the central axis Z, a simplified schematic depiction of a curing mold 7 used for molding and vulcanizing a tire 1.

Such a curing mold 7 comprises several rigid components which, when said mold is in the closed configuration, define a molding cavity 20 delimited by walls 21 of which the arrangement corresponds to the shape that is to be conferred upon the exterior surface 6 of the tire. These rigid components may be arranged for example as two molding parts which come into contact with one another, when the mold is closed, along a parting plane that is coincident with the equatorial plane P_EQ. Actuators are provided for maneuvering these molding parts so as to close the mold 7 after the green tire 3 has been placed therein and before the curing operation commences, and then to open the mold 7 at the end of curing in order to extract the cured tire 1. At the center of the mold, there is a central rod which supports two disc-shaped plates 22, 23, held axially distant from one another and to which the curing membrane 2 is attached in an airtight manner by its ends referred to as "feet" 24, 25 so that the internal volume delimited by the curing membrane 2 forms a bladder capable of receiving and containing an inflating fluid, preferably a heat-transfer fluid, such as steam, which is injected under pressure for curing and then removed at the end of curing by means of an orifice provided for this purpose in at least one of the plates 22, 23.

As visible in FIGS. 1A and 2, the curing membrane 2 comprises an elastically expandable hollow tubular body 26 of which the external surface forms the contact surface 4 that comes to press against the green tire 3, and which is delimited axially by two ends, forming a first foot 24 and a second foot 25.

The curing membrane 2 exhibits, overall, a shape having symmetry of revolution, of which the central axis Z and, respectively, the equatorial plane P_EQ, will coincide with the central axis Z of the tire and, respectively, with the equatorial plane P_EQ of the tire, at least during the phase of curing inside the mold 7, when the curing membrane 2 is in the inflated state and is pressing the green tire 3 intimately into the configuration that corresponds to the finished tire 1.

The curing membrane 2 is preferably made of butyl rubber vulcanized with resin. This is because such material exhibits good fluidtightness with respect to the inflation fluid and a good ability to withstand repeated curing cycles. In particular, the use of a resin as vulcanizing agent, instead of sulfur, means that the curing membrane 2 can be vulcanized at a high temperature, whereas the tire curing cycles are then performed at lower temperatures, which said curing membrane 2 is therefore extremely capable of withstanding.

The curing membrane 2 will preferably be manufactured by molding on a core that is nominally barrel-shaped, having a diameter which is greater in its central part, in the region of the equatorial plane P_EQ, than at the axial ends of said core. Thus, the curing membrane 2 will preferably have, at rest, before use in the mold, a nominal shape that will complement that of the core, and therefore in this instance a barrel shape, with a bulge in its equatorial part.

More generally, the curing membrane 2 will thus preferably, at rest, out of the mold 7, have a contact surface 4 of bulging cylindrical shape, substantially ovoidal, extending along and about a central axis Z from a first foot 24 that forms a north pole, as far as a second foot 25 that forms a south pole, passing through an equatorial line EQ_2 centered on the central axis Z and comprised in an equatorial plane P_EQ, normal to said central axis Z, which divides the contact surface 4 into a northern hemisphere 4N and a southern hemisphere 4S.

Advantageously, given the foregoing, for the sake of convenience of description, the same frame of references, based on the central axis Z and the equatorial plane P_EQ, will be associated with the curing membrane 2, with the green tire 3 and with the tire 1, and the same references will therefore be used to denote the central axis Z and the equatorial plane P_EQ whether referring to the curing membrane 2, to the tire 1 or to the green tire 3.

By contrast, for the sake of clarity, a distinction may preferably be made between the equatorial line EQ_2 of the membrane 2 and the equatorial line EQ_1 of the tire 1.

According to the disclosure, the contact surface 4 of the curing membrane 2 is provided with a drainage structure 30 which comprises air-discharge paths C31, C32, C33 cut into the contact surface 4 to a depth equal to or greater than 0.05 mm and referred to as "channels" C31, C32, C33.

Within the meaning of the disclosure, the elements cut into the contact surface 4, able to remove the air towards the feet 24, 25, and the depth of which is deemed to be sufficiently significant to be able to perform such a function intentionally, are considered to be channels C31, C32, C33. In this instance, this depth will therefore need to be equal to or greater than a predetermined threshold value referred to as the "lower threshold", which will here be chosen to be equal to 0.05 mm.

This step is preferably measured on the curing membrane 2 considered at rest, i.e. not distended by the inflation fluid, and more preferably while said curing membrane 2 is in a flaccid configuration, at ambient atmospheric pressure, for example when the curing membrane 2 is outside the mold.

Furthermore, by way of indication, the "smooth" parts of the contact surface 4 that are not cut with channels, and more particularly the "smooth" parts of the drainage structure 30, which form the solid reliefs M31_in, M32_in, M33_in that separate the adjacent channels C31, C32, C33 and which are intended to come into direct contact with the interior surface 5 of the tire 1, will have a roughness very markedly lower than the 0.05 mm value considered to be the lower threshold for the channels. As a preference, the corresponding surfaces of the core which is used for manufacturing the curing membrane 2 using molding will, for that purpose, have a roughness Ra (arithmetic mean difference in profile) equal to, or even less than, 1.6 μm.

According to the disclosure, the drainage structure 30 is subdivided, at least on one side of the equatorial plane P_EQ, and preferably similarly or even symmetrically on each side of said equatorial plane P_EQ, into at least three drainage regions 31, 32, 33, these being:

a first drainage region 31 which corresponds to a first annular portion of the contact surface 4, centered on the central axis Z, along which said contact surface 4, and more particularly the drainage structure 30, will hug the crown region 11, a second drainage region 32 which corresponds to a second annular portion of the contact surface 4, centered on the central axis Z, along which said contact surface 4, and more particularly the drainage structure 30, will hug the sidewall region 12, and the channels C32 of which communicate with the channels C31 of the first drainage region 31, and a third drainage region 33 which corresponds to a third annular portion of the contact surface 4, centered on the central axis Z, along which said contact surface 4, and more particularly the drainage structure 30, will hug the bead region 13, and the channels C33 of which communicate with the channels C32 of the second drainage region 32.

Still according to the disclosure, the mean depth of the channels C33 of the third drainage region 33 is strictly greater than the mean depth of the channels C32 of the second drainage region 32, said mean depth of the channels C32 of the second drainage region 32 being itself strictly greater than the mean depth of the channels C31 of the first drainage region 31.

Within the meaning of the disclosure, the "mean depth of the channels" of a drainage region 31, 32, 33 concerned, whether this be the first drainage region 31, the second drainage region 32, or respectively the third drainage region 33, is equal to the quotient of the volume occupied by the channels C31, C32, C33 present in said drainage region 31, 32, 33 by the surface area covered by these same channels C31, C32, C33 in said drainage region 31, 32, 33.

An "annular portion" refers to an annular band of the contact surface 4, comprised between two lines which are parallel to the equatorial line EQ_2.

The mean depth of the channels C31, C32, C33 in the drainage region 31, 32, 33 concerned is thus equal to the quotient of, on the one hand, in the numerator, the volume of all of the channels C31, C32, C33 (of all shapes and/or sizes where appropriate, provided that the depth of said channels is greater than or equal to the aforementioned lower threshold of 0.05 mm) cut into said annular band of the contact surface 4 by, on the other hand, in the denominator, the product of the width times the combined length of all of these same channels C31, C32, C33 present in said annular band, said product in effect corresponding to the surface area occupied by the cut-outs of these channels C31, C32, C33 at the surface of the annular band of the contact surface 4.

Advantageously, the mean depth which is specific to the drainage region concerned is strictly greater than the mean depth of the drainage region that precedes it, in a direction corresponding to the overall direction in which the air flows, and which will therefore be from the crown region 11 as far as the bead region 13, passing via the sidewall region 12. Thus, the mean depth of the channels C31, C32, C33 will increase overall in the direction progressing from the first drainage region 31 towards the third drainage region 33, passing via the second drainage region 32 which is interposed between said first and third drainage regions 31, 33, and therefore in the direction progressing from the crown region 11 towards the bead region 13, and more particularly in the direction progressing from the equatorial line EQ_2 towards a foot 24, 25.

As indicated above, such an arrangement allows the drainage capacities of the curing membrane 2 to be distributed optimally in space, with respect to those regions 11, 12, 13 of the tire 1 that are to be drained (crown region 11, sidewall region 12, bead region 13) and in time, according to the order in which each contact is established between the curing membrane 2 and the various regions 11, 12, 13 of the tire 1.

Thus, the arrangement according to the disclosure allows the provision, with respect to each tire region (crown region 11, sidewall region 12, bead region 13) of the drainage structure that is most suitable, bearing in mind the volume of air to be removed from said region 11, 12, 13 of the tire and the order in which the curing membrane 2 successively comes into contact with the various regions of the tire.

Furthermore, the arrangement proposed by the disclosure allows the behavior of the curing membrane 2 to be adapted to suit the fact that the green tire 3, just like the curing membrane 2, does not experience, at all points, an elongation that is uniform under the effect of the inflation, because the degree of elongation is notably dependent on the distance of the region concerned from the central axis Z. Specifically, said elongation is proportionally greater in the crown region 11, which has a large diameter, than in the bead region 13, which has a smaller diameter. Thus, by combining the choice of the depth of the channels 31 32, 33 with a careful distribution of said channels according to the tire region 11, 12, 13 concerned, it is possible to achieve optimal control over both, on the one hand, the degree of penetration of the inner liner depthwise into the channels and, on the other hand, the surface elongation, and notably the circumferential elongation, of said inner liner as a proportion of the distance from the central axis Z, thereby allowing fairly fine control over the plastic deformation and the striction of said inner liner at various points of the tire 1.

The depth of the channels C31, C32, C33 of each drainage region 31, 32, 33 is advantageously chosen so as to be, at any point on the tire 1, and therefore at any corresponding point on the contact surface 4 of the curing membrane 2, on the one hand high enough to ensure an air-removal flow rate and duration that are sufficient to purge all of the air trapped between the curing membrane 2 and the tire regions 11, 12, 13 covered, while at the same time being low enough to avoid significant deformation, and therefore significant loss of thickness, of the airtight film that forms the interior surface 5 of the tire 1.

The disclosure therefore allows a different configuration of drainage region 31, 32, 33 to be applied to each region 11, 12, 13 of the tire (crown region 11, sidewall region 12, bead region 13) and therefore to make a distinction, in some way to customize, the drainage operation that is performed, according to the region of the tire that is to be drained and according to the order in which the curing membrane 2 is applied against said regions 11, 12, 13 of the tire, by applying, within each region of the tire, just the necessary quantity, volume-wise, of channels.

It will be noted that the disclosure advantageously allows the different types of channels C31, C32, C33 to be separated spatially according to the characteristic depth of each of these types of channels, by distributing said channels in the drainage regions 31, 32, 33 in order, in this instance in increasing order, of characteristic depth. In that way, the disclosure is able overall to limit the depth of the channels of the drainage structure 30 and thus overall to restrict the irregularities of the contact surface 4 and therefore limit the expanse of the developed surface that the molding operation imposes on the inner liner of the tire.

In so doing, the disclosure may notably be distinguished from the drainage structures known from the prior art, in which, rather than seeking to distribute the various types of channels in distinct drainage regions, according to the characteristic depth of each type of channel and according to the region 11, 12, 13 of the tire 1 with which said drainage region 31, 32, 33 is to collaborate, several types of channels, for example two or even three types of channels, each having a different characteristic depth, including on the one hand somewhat shallow channels, for example having a range of depths typical of that which the disclosure proposes to assign more specifically to the channels C31 characteristic of the first drainage region 31, and, on the other hand, deep channels, having a range of characteristic depths here preferably reserved for the third drainage region 33 according to the disclosure, are rather intermingled within the one same annular drainage region, notably within the one same annular drainage region that comes into contact with the crown region 11 of the tire.

Advantageously, the first, the second and the third drainage region 31, 32, 33 each occupy, with reference to the equatorial line EQ_2, a distinct range of latitude, which is specific to them, and which is defined notably according to the range of latitude occupied by the respective region 11, 12, 13 of the tire 1 against which region each of said first, second and third drainage regions 31, 32, 33 is to come to bear.

Thus it is possible to identify, on the contact surface 4 of the curing membrane, along a meridian line which follows said contact surface 4, starting from the equatorial line EQ_2 and ending at a foot 24, a first drainage region 31 occupying a first range of latitude, in this instance the one closest to the equatorial plane P_EQ and preferably containing or flanked by the equatorial line EQ_2, a second drainage region 32 occupying a second range of latitude, not overlapping the first range of latitude, and then a third drainage region 33 occupying a third range of latitude, closer to the foot 24 than the first and second range of latitude and not overlapping the second range of latitude, so that the first drainage region 31 comes to bear against the crown region 11, the second drainage region 32 against the sidewall region 12, and the third drainage region 33 against the bead region 13.

It will be noted that, in absolute terms, within the meaning of the disclosure, there might, within the one same drainage region 31 32, 33, be several types of channels C31, C32, C33 arranged in patterns of distinct outline and/or with distinct depths, coexisting within said drainage region, and the mean depth of which would be calculated, as indicated above, by dividing the total void volume defined by these channels by the total surface area occupied by these same channels in the drainage region concerned.

That being the case, for the sake of convenience of embodiment, and as will be detailed later on, one type of channel, or "family of channels", which is characteristic of each drainage region 31, 32, 33 and which has one single same geometric pattern of outline and/or one single same depth or predetermined range of depths throughout the drainage region 31, 32, 33 concerned can be assigned to said drainage region so that in practice the boundaries of the drainage regions, and more particularly the parallels P1, P2 that define the boundaries of the ranges of latitude which are occupied respectively by each of said drainage regions 31, 32, 33, can be made to coincide, notably visually, with the limit-points from which each of the families of channels C31, C32, C33 specific to each drainage region 31, 32, 33 successively appears.

In other words, the boundaries between the drainage regions 31, 32, 33 may, in a preferred variant of the disclosure, coincide with the material boundaries at which a change in the type of channels C31, C32, C33 and, more particularly, a change either in the geometric pattern of the outline of the channels C31, C32, C33 on the contact surface 4, or in the depth of the channels C31, C32, C33, or in both of these two parameters, is observed.

More particularly, there may thus be, in the first drainage region 31, a first family of channels C31, in the second drainage region 32, a second family of channels C32 which is not found in the first drainage region 31 and of which at least one dimensional characteristic, notably the depth, differs from the corresponding characteristic of the first family of channels C31, and likewise, there may be, in the third drainage region 33, a third family of channels C33 that is not found in the second drainage region 32 or in the first drainage region 31, and of which at least one dimensional characteristic, notably the depth, differs from the corresponding characteristic of the second family of channels C32. The boundary between the first drainage region 31 and the second drainage region 32, typically a first parallel P1, may then correspond to the border at which the second family of channels C32 appears, and likewise, the boundary between the second drainage region 32 and the third drainage region 33, typically a second parallel P2, may then correspond to the border at which the third family of channels C33 appears.

As a preference, as can be seen in FIGS. 1A and 2, the boundary between the first drainage region 31 and the second drainage region 32 follows a line P1 referred to as the "first parallel" along which the normal N1 to the interior surface 5 of the tire 1 is inclined, with respect to the central axis Z, by an angle A1 referred to as the "first declination angle" A1 which is comprised between 40 degrees and 85 degrees, preferably between 45 degrees and 85 degrees, or even between 50 degrees and 80 degrees.

The aforementioned first declination angle A1 is considered here in projection in a sagittal plane of section containing the central axis Z, with respect to the perpendicular cross section of the tire 1, as visible in FIG. 2.

In practice, the first parallel P1 is chosen to coincide substantially with a point referred to as the "first singular point" which corresponds to the transition from the crown region 11 to the sidewall region 12.

Advantageously, the boundary between the first drainage region 31 and the second drainage region 32 is thus situated at the transition between the crown region 11 and the sidewall region 12, preferably substantially at the mid-point of the shoulder of the tire, as this allows the first drainage region 31 of the curing membrane 2 to cover the crown region 11 almost in its entirety and then allows the second drainage region 32 to then be applied progressively against the sidewall region 12 of the tire, as the curing membrane 2 progressively continues to deploy into the hollow of said sidewall region 12 and, more particularly, into the axially outermost part of the interior surface 5 of said sidewall region 12 of the tire 1.

It will be noted that the aforementioned values for the first declination angle A1 here correspond to those recorded when the curing membrane 2 is in the inflated state, during curing in the mold 7, and therefore in practice correspond to the shape of the finished tire 1.

Furthermore, the aforementioned ranges for the first declination angle A1 advantageously correspond in practice to those that can be observed during, and that apply to, the molding of most sizes of tires 1, possibly all sizes of tires 1, that a person skilled in the art might consider.

That being the case, where appropriate, and notably if a tire 1 should have highly specific proportions, and notably if a tire 1 should have a particular H1/B1 ratio, where H1 refers, as visible in FIG. 2, to the overall radial height of the cross section of the tire 1, namely the radial extent occupied, from the bead to the crown, by the cross section of the tire 1 with respect to the central axis Z, and where B1 refers to the section width, namely the overall axial width of said tire 1, it would then be conceivable to adapt these values for the declination angle A1, particularly as a function of said ratio H1/B1, so as to maintain a boundary between the first drainage region 31 and the second drainage region 32 that substantially coincides with the transition between the crown region 11 and the sidewall region 12 of said tire.

As a preference, the boundary between the second drainage region 32 and the third drainage region 33 follows a line P2 referred to as the "second parallel" along which the normal N2 to the interior surface 5 of the tire 1 forms, with respect to the central axis Z, an angle A2 referred to as the "second declination angle" A2 which is comprised between zero degrees and 30 degrees.

It will be noted that this value for the second declination angle A2 is an absolute value and that the sign of the second declination angle A2, namely the sign of the angle formed when measuring from the central axis towards the normal considered, may be the opposite, as is the case in FIG. 2, of the sign of the first declination angle A1 that characterizes the first parallel P1.

More particularly, it may be considered, by convention, that the sign of the declination angle A1, A2 from a normal N1, N2 to the interior surface 5 of the tire is positive in that portion of the interior surface 5 that is comprised between the equatorial plane P_EQ and the crest line LC which corresponds to the deepest part of the sidewall region 12, namely which passes, in each perpendicular section of the tire 1, through that point on said interior surface of the tire that is axially outermost, namely most axially distant from the equatorial plane P_EQ, whereas the declination angle becomes negative when the crest line LC has been crossed to enter that portion of the interior surface 5 that is comprised between said crest line LC and the nearest bead 13 of the tire or, respectively, the nearest foot 24 of the curing membrane 2, considering progress along the interior surface 5 of the tire from the equatorial line EQ_2 of the curing membrane 2 and towards said foot 24. It will be noted that, on the crest line LC, the normal to the interior surface 5 of the tire 1 is parallel to the central axis Z so that its declination angle is zero.

In any event, by virtue of the proposed arrangement whereby the first parallel P1 is arranged so that it lies between the crown region 11 and the crest line LC, at a positive first declination angle A1, while the second parallel P2 that forms the boundary between the second drainage region 32 and the third drainage region 33 is intended to be positioned beyond the crest line LC, between said crest line LC and the foot 24, at a negative second declination angle A2, it is ensured that the axially outermost point of the interior surface 5 of the tire 1, at which point the curing membrane 2 theoretically finishes deploying and therefore, more generally, the crest line LC, lies in the second drainage region 32 of the curing membrane 2.

In practice, the second parallel P2 is chosen to coincide substantially with a second singular point which corresponds to the transition between the sidewall region 12 and the bead region 13.

Once again, the ranges of values envisaged hereinabove for the second declination angle A2 preferably relate to tires 1 having an H1/B1 ratio considered to be customary, and they may, if necessary, notably if specific tire proportions justify such an approach, be adapted accordingly, for example according to the H1/B1 ratio.

As indicated above, a mean depth, and therefore a degree of scale in terms of depth, is assigned to each drainage region 31, 32, 33 and is specific to said drainage region, and increases as the first drainage region 31, then the second drainage region 32, then the third drainage region 33, are progressively crossed, in that order.

More specifically, at least three successive degrees of scale can be assigned respectively to the drainage structure 30, these degrees namely being a first degree of scale referred to as "microscopic" in the first drainage region 31, a second degree of scale referred to as "mesoscopic" in the second drainage region 32, and a third degree of scale referred to as "macroscopic" in the third drainage region 33.

Thus, as a preference, the mean depth of the channels C31 in the first drainage region 31 is comprised between 0.05 mm and 0.25 mm.

Advantageously, this first degree of mean depth, corresponding to the "microscopic" scale, will allow the air situated facing the crown region 11 of the tire 1 to be drained away without this causing excessive distension of the inner liner.

It will be noted that the depth values used for describing the disclosure will preferably be the values of the depth of the channels C31, C32, C33 measured on the curing membrane 2 at rest, out of the mold. However, within the meaning of the disclosure, it is not excluded for these values to be obtained and recorded on the finished tire 1, the interior surface of which will have adopted the negative impression of the shape of the curing membrane during the curing operation.

Specifically, the inventors have found that, in practice, the heights of the reliefs ultimately obtained on the interior surface of the tire 1, which reliefs are therefore complementary to the channels C31, C32, C33, are in fact very close, if not to say equal, to the depths of said channels when considered on the curing membrane 2 at rest. In other words, although one might expect the surface-wise extension of the curing membrane 2 to bring about a certain reduction in the thickness of said curing membrane 2, and therefore potentially a certain reduction in the depth of the channels, it is found in fine that the extension of the curing membrane 2 in fact has virtually no influence on the respective depths of the channels C31, C32, C33 and that these depths remain virtually identical between the curing membrane 2 in the rest configuration and said curing membrane 2 in the deployed, inflated, configuration.

As a preference, at least 50%, preferably at least 80%, or even 100% of the channels C31 of the first drainage region 31 have a depth H31 which is comprised between 0.05 mm and 0.25 mm.

In other words, the first drainage region 31 will preferably comprise predominantly (>50%) or exclusively (100%) channels C31 at the so-called "microscopic" scale, of which the absolute depth H31 is greater than or equal to 0.05 mm and less than or equal to 0.25 mm.

The aforementioned percentages correspond to the ratio of the surface area of the channels C31 present in the first drainage region 31 and having a depth comprised within the aforementioned first range of depths, namely [0.05 mm; 0.25 mm], to the total surface area occupied by all of the channels present in said first drainage region 31.

Advantageously, because one single same type of channel, namely the channels C31 of "microscopic" type, predominates within the first drainage region 31, or else insofar as only channels C31 of "microscopic" type are to be found within said first drainage region 31, said first drainage region 31 has flow paths of relatively homogeneous, or even perfectly homogeneous, depth, notably allowing a simplifying and standardizing of the manufacture of the curing membrane 2 and ensuring good control over the flow of air during curing.

It will be noted that, in absolute terms, the depth H31 of the microscopic-scale channels C31 of the first drainage region 31 could vary from one channel C31 to another, or along the one same channel C31, without departing from the scope of the disclosure, provided that, at every point on the channel C31 considered in the first drainage region 31, said height H31 remains confined within the aforementioned first range of depths, namely [0.05 mm; 0.25 mm].

However, according to a preferred embodiment variant, the majority (>50%) and preferably all (100%) of the channels C31 of the first drainage region 31 will have an identical and constant depth H31 comprised within the aforementioned first range of depths, namely [0.05 mm; 0.25 mm].

This uniformity will notably facilitate the manufacture of the curing membrane 2.

It will furthermore be noted that, if all the channels of the one same drainage region have an identical and constant depth referred to as the "nominal depth", and, in particular, if said drainage region comprises exclusively the one same type of channels of a given constant nominal depth, then the mean depth in said drainage region will advantageously be equal to said nominal depth.

Similarly, the mean depth of the channels C32 in the second drainage region 32 is preferably comprised between 0.25 mm and 0.45 mm.

As a preference, at least 50%, preferably at least 80%, or even 100% of the channels C32 of the second drainage region 32 have a depth H32 which is comprised between 0.25 mm and 0.45 mm.

Here too, this allows the provision of a second drainage region 32 which is predominantly (>50%) or even exclusively (100%) provided with channels C32 at the so-called "mesoscopic" scale, of which the absolute depth H32 is comprised in a second range of depths, in this instance [0.25 mm; 0.45 mm], which is greater than the aforementioned first range of depths, namely [0.05 mm; 0.25 mm], and does not overlap said first range of depths.

As a preference, all the channels C32 of the second drainage region 32 will have a depth H32 strictly greater than the depth H31, or, where appropriate, than all of the depths H31, of the channels C31 present in the first drainage region 31.

In other words, the minimum depth of the channels C32 of the second drainage region 32, or, more particularly, where appropriate, the minimum depth of the channels C32 which are specific to the second drainage region 32 and which are therefore not found in the first drainage region 31, will preferably be greater than the maximum depth of the channels C31 of the first drainage region 31.

This then will encourage air to flow from the first drainage region 31 to and through the second drainage region 32, notably without the risk of either creating, within the network of channels C31, C32, a retention pocket which could keep a trapped bubble of air, or cause excessive localized thinning of the inner liner.

According to a preferred embodiment variant, the majority (>50%) and preferably all (100%) of the channels C32 of the second drainage region 32 will have an identical and constant depth H32 comprised within the aforementioned second range of depths, namely [0.25 mm; 0.45 mm].

Here too, this will simplify the manufacture of the curing membrane 2.

As a preference, the mean depth of the channels C33 in the third drainage region 33 is comprised between 0.45 mm and 1.20 mm.

As a preference, at least 50%, preferably at least 80%, or even 100% of the channels C33 of the third drainage region 33 have a depth H33 which is comprised between 0.45 mm and 1.20 mm.

More preferably still, according to a variant that enables a reduction in the cost of manufacture of the curing membrane 2 by limiting the height of the reliefs of the core used for molding said curing membrane, at least 50%, preferably at least 80%, or even 100% of the channels C33 of the third drainage region 33 have a depth H33 which is comprised between 0.45 mm and 0.60 mm.

Here too, the disclosure allows the provision of a third drainage region 33 which is predominantly (>50%) or even exclusively (100%) provided with channels C33 at the so-called "macroscopic" scale, of which the absolute depth H33 is comprised in a third range of depths, in this instance [0.45 mm; 1.20 mm], or, respectively [0.45 mm; 0.60 mm], which is greater than the aforementioned second range of depths, namely [0.25 mm; 0.45 mm], and does not overlap the second range of depths.

As a preference, the majority, or even all, of the channels C33 of the third drainage region 33 will have a depth H33 strictly greater than the depth H32, or, where appropriate, than all of the depths H32, of the channels C32 present in the second drainage region 32.

In other words, the minimum depth of the channels C33 of the third drainage region 33 or, at the very least of the channels C33 which are specific to the third drainage region and which are not found in the second drainage region 32, will preferably be greater than the maximum depth of the channels C32 of the second drainage region 32.

Moreover, according to a preferred embodiment variant, the majority and preferably all of the channels C33 of the third drainage region 33 will have an identical and constant depth H33 comprised within the aforementioned third range of depths, namely [0.45 mm; 1.20 mm] or, where appropriate, [0.45 mm; 0.60 mm].

Figure 3:
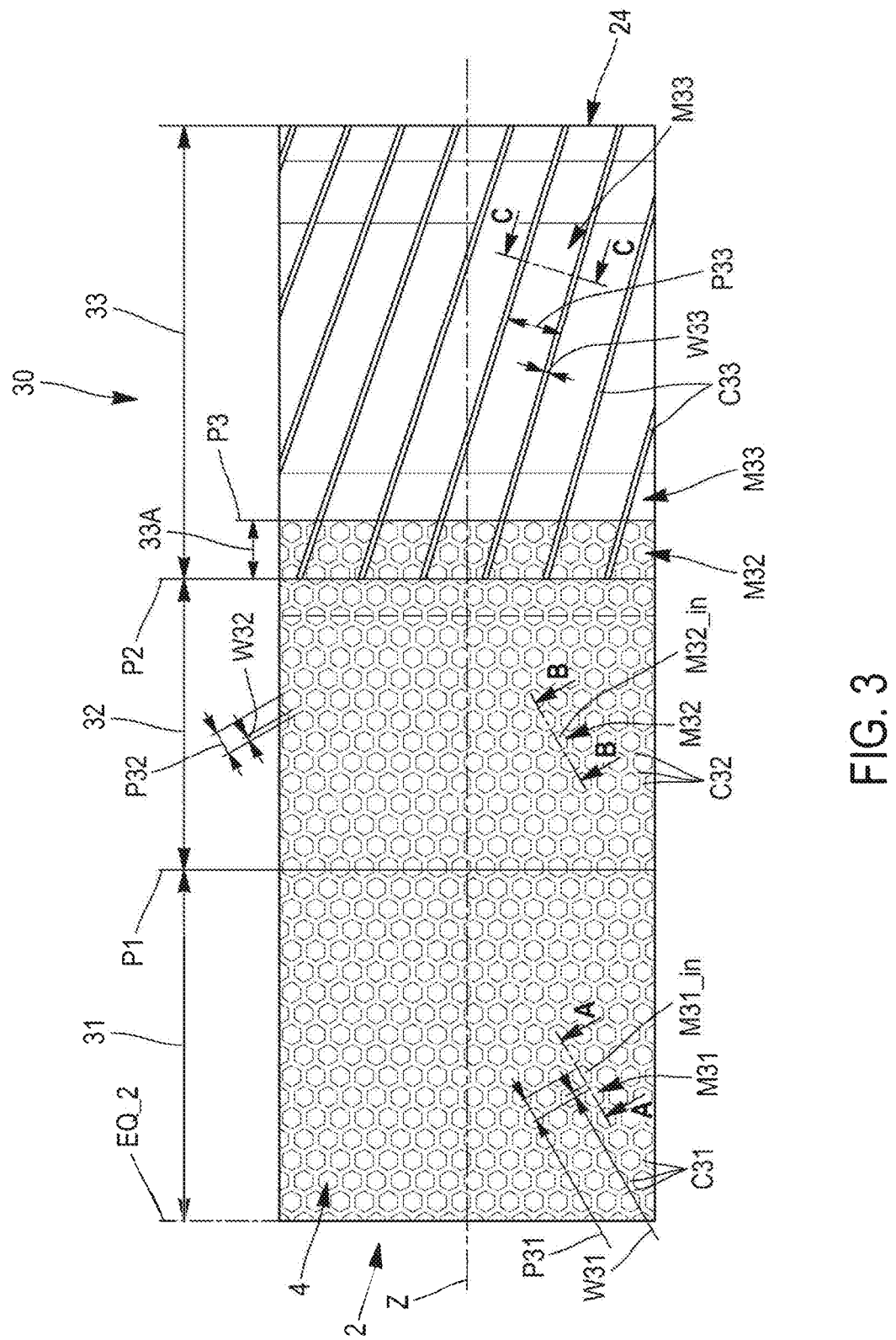
FIG. 3 is a detailed view of the first, second and third drainage regions of FIG. 1B, showing a preferred arrangement of drainage patterns each associated with one of said drainage regions.
Figure 4:
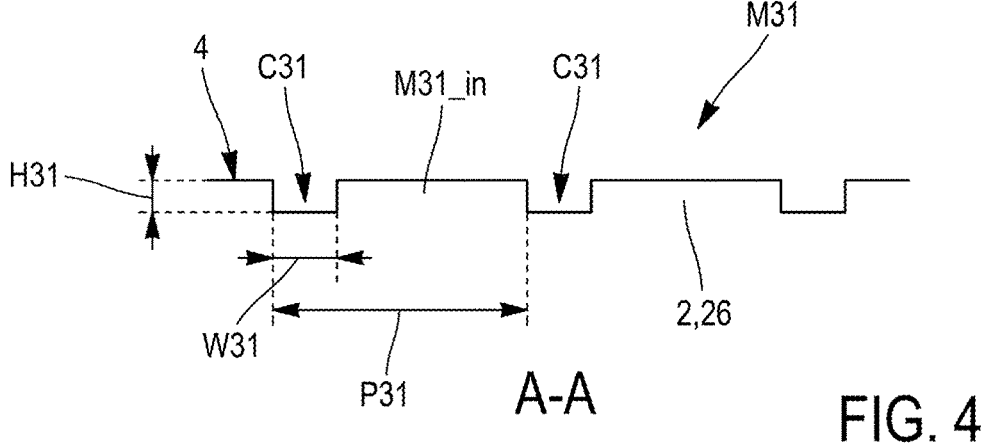
FIG. 4 is a detailed view in section of the curing membrane of FIGS. 1A, 1B and 3 in the first drainage region, on a plane of section perpendicular to the longitudinal direction of the channels, so as to show the depth of said channels cut into the thickness of said curing membrane.

As a preference, and as illustrated in FIGS. 3 and 4, the first drainage region 31 comprises a first family of channels C31 which are formed by repeating a first pattern M31 which gives the channels C31 of said first family a depth H31 comprised between 0.05 mm and 0.25 mm, a width W31 comprised between 0.4 mm and 1.5 mm and a first repeat pitch P31 comprised between 2 mm and 15 mm.

This first pattern M31 may be of any shape suitable for carpeting the first drainage region 31 and that allows the channels C31, C32 the intercommunication necessary for the flow of the air.

For example, this first pattern M31 may adopt the shape of a polygon, preferably a regular polygon, of which the channels C31 will correspond to the edges, and of which the internal region M31_in, corresponding to a solid relief separating the adjacent channels, will form the contact surface 4 of the curing membrane 2 which comes to bear directly against the interior surface 5 of the tire 1 and from which the depth H31 is therefore measured.

As a particular preference, and as is notably visible in FIG. 3, the first pattern M31 will be hexagonal.

Advantageously, the first pattern M31 will repeat around the entire circumference of the annular band that forms the first drainage region 31, so as to cover an angular sector of 360 degrees about the central axis Z, and thus allow uniform drainage of the entire crown region 11 of the tire.

As a preference, as indicated above, this first pattern M31 will be found predominantly or even exclusively in the first drainage region 31.

Figure 5:
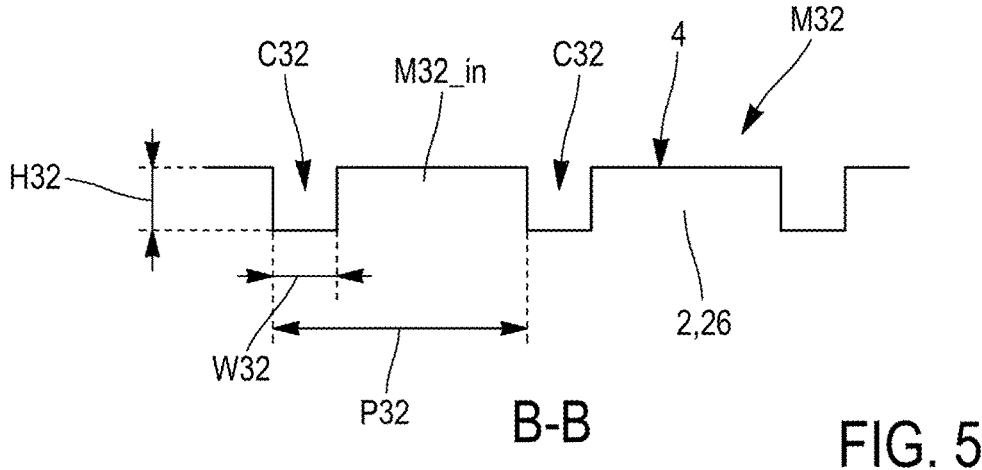
FIG. 5 is a detailed view in section of the curing membrane of FIGS. 1A, 1B and 3 in the second drainage region, on a plane of section perpendicular to the longitudinal direction of the channels, so as to show the depth of said channels cut into the thickness of said curing membrane.

As a preference, and as illustrated in FIGS. 3 and 5, the second drainage region 32 comprises a second family of channels C32 which are formed by repeating a second pattern M32 which gives the channels C32 of said second family a depth H32 comprised between 0.25 mm and 0.45 mm, a width W32 comprised between 0.4 mm and 1.5 mm and a second repeat pitch P32 comprised between 2 mm and 15 mm.

Just like the first pattern M31, this second pattern M32 may be of any shape suitable for carpeting the second drainage region 32 and that allows the channels C31, C32, C33 the intercommunication necessary for the flow of the air.

For example, this second pattern M32 may adopt the shape of a polygon, preferably a regular polygon, of which the channels will correspond to the edges, and of which the internal region M32_in, corresponding to a solid relief separating the adjacent channels, will form the contact surface 4 of the curing membrane 2 which comes to bear directly against the interior surface 5 of the tire 1 and from which the depth H32 is therefore measured.

As a particular preference, and as is notably visible in FIG. 3, the second pattern M32 will be hexagonal, particularly if the first pattern M31 is itself hexagonal.

According to one layout possibility, and particularly if the first pattern M31 and the second pattern M32 are both hexagonal, the second repeat pitch P32 may be identical to the first repeat pitch P31. If appropriate, the width W32 of the second channels C32 may also be equal to the width W31 of the first channels.

By contrast, in either one of these instances, the depth H32 of the channels C32 associated with the second pattern M32 will be strictly greater than the depth H31 of the channels C31 associated with the first pattern M31.

Furthermore, the second pattern M32 will repeat preferably around the entire circumference of the annular band that forms the second drainage region 32, so as to cover, preferably just like the first pattern M31, an angular sector of 360 degrees about the central axis Z, and thus allow uniform drainage of the entire sidewall region 12 of the tire.

As a preference, as indicated above, this second pattern M32 will be found predominantly (>50%) or even exclusively (100%) in the second drainage region 32.

Figure 6:
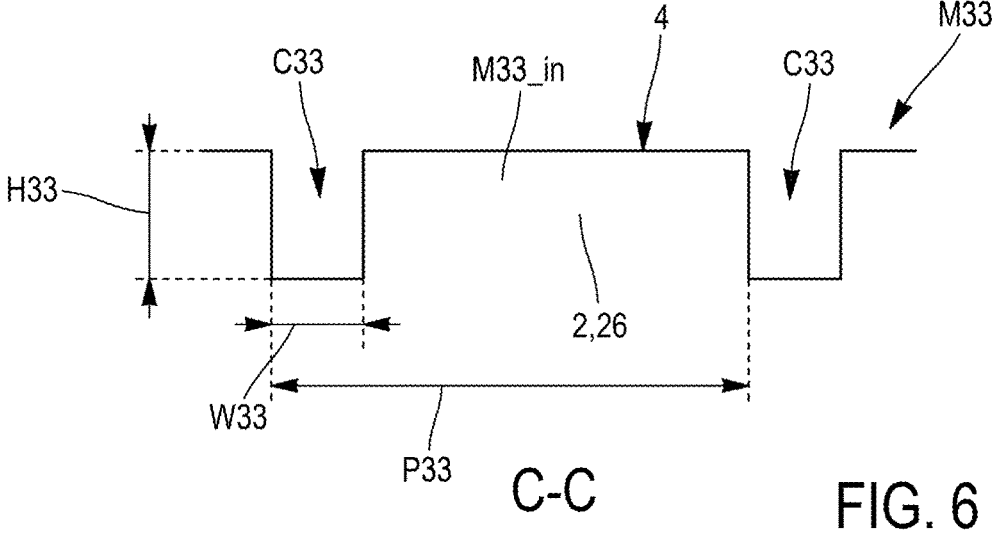
FIG. 6 is a detailed view in section of the curing membrane of FIGS. 1A, 1B and 3 in the third drainage region, on a plane of section perpendicular to the longitudinal direction of the channels, so as to show the depth of said channels cut into the thickness of said curing membrane.

Moreover, as illustrated in FIGS. 3 and 6, the third drainage region 33 preferably comprises a third family of channels C33 which are formed by repeating a third pattern M33 which gives the channels C33 of said third family a depth H33 comprised between 0.45 mm and 1.20 mm, or possibly between 0.45 mm and 0.60 mm as indicated above, a width W33 comprised between 0.4 mm and 2 mm and a repeat pitch P33 comprised between 4 mm and 40 mm, or even preferably between 6 mm and 30 mm.

As a preference, and for example in combination with a hexagonal layout of the second pattern M32 and, where appropriate, with a hexagonal layout of the first pattern M31, this third pattern M33 is in parallel straight bands.

According to this third pattern M33, between two consecutive parallel channels C33 each forming a rectilinear depression of the groove type, the solid part M33_in of the pattern forms an embankment which corresponds to the contact surface 4 of the curing membrane 2, which comes into direct contact with the interior surface 5 of the tire, and with respect to which the depth H33 is measured.

Because of their parallel layout, these channels C33 of the third family have no elbow or fork, or intersection with one another. They are thus particularly easy to produce and effective at allowing a significant volume of air to circulate with little pressure drop and, where appropriate, with high flow rate.

As a preference, as visible in FIGS. 1B and 3, these straight channels C33 are inclined with respect to a meridian line of the curing membrane 2, for example by the order of 30 degrees, so as to form a helicoidal pattern around central axis Z.

As a preference, the second drainage region 32 is contiguous with the first drainage region 31 on one side, and is contiguous with the third drainage region 33 on the other side.

Furthermore, according to one layout possibility, one or more hybrid boundaries regions may be provided, these forming a transition between two consecutive drainage regions, and being regions in which the patterns of channels characteristic of each of the drainage regions flanking said boundary region coexist.

Thus, by way of example, and as is visible in FIGS. 1B and 3, there may be provided a hybrid boundary region 33A included within the third drainage region 33, which hybrid boundary region 33A begins at the second parallel P2 and extends towards the foot 24 over just part of the latitude band occupied by the third drainage region 33, and within which there coexist the parallel channels set out according to the third pattern M33, which begin from the second parallel P2, and the channels characteristic of the second drainage region 32, arranged in hexagons according to the second pattern M32, and which stop at a third parallel P3 corresponding to the end of said hybrid boundary region 33A, beyond which exclusively parallel channels C33, which continue according to the third pattern M33, can be found. Thus, the third drainage region 33 may, in fine, exhibit first of all a hybrid region 33A, comprising channels according to the second pattern M32 and channels according to the third pattern M33, and then an exclusive region containing only channels according to the third pattern M33.

According to one particularly preferred layout possibility, the curing membrane 2 will comprise a first drainage region 31 containing exclusively a hexagonal first pattern M31 having a constant first depth H31, comprised between 0.05 mm and 0.25 mm, a second drainage region 32 which adjoins the first drainage region 31 along a boundary line that forms a first parallel P1 and which contains exclusively a hexagonal second pattern M32, preferably having the same repeat pitch P32 and the same channel width W32 as the first pattern M31, having a constant second depth H32 greater than the first depth H31 and comprised between 0.25 mm and 0.45 mm, and finally a third drainage region 33 comprising a third pattern M33 in parallel bands, having a constant third depth H33, greater than the second depth H32 and comprised between 0.45 mm and 1.20 mm. This variant will preferably include a boundary region 33A as described hereinabove, between the second parallel P2 and the third parallel P3.

According to another embodiment variant not depicted, the third pattern M33 in parallel bands is replaced by a hexagonal third pattern M33, having a third repeat pitch P33 greater than the second repeat pitch P32 of the hexagonal second pattern M32 and of which the depth H33, which is constant and greater than the depth H32 of the hexagonal second pattern M32, is comprised between 0.45 mm and 0.6 mm, and the channel width W33 is comprised between 0.4 m and 2 mm.

Of course, the disclosure also relates to a cured tire 1 originating from a curing method according to the disclosure according to any one of the features described in the foregoing, such a tire 1 being identifiable by the presence, on its interior face, of a structure, in relief, which corresponds to the negative of the multi-region drainage structure 30 according to the disclosure.

Thus, the disclosure relates notably to a tire 1 having, on its interior surface 5, three distinct annular portions, centered on the central axis Z, and which are situated, on the one same side of the equatorial plane P_EQ, respectively beneath the crown region 11, beneath the sidewall region 12, and beneath the bead region 13 of said tire 1, and which contain ribs of a height equal to or greater than 0.05 mm, which correspond to the respective impressions, in negative, of the channels C31, C32, C33 of the distinct first, second and third drainage regions 31, 32, 33, and which are dimensioned in such a way that the first annular portion has a mean rib height strictly less than the mean height of the ribs of the second annular portion, said mean height of the ribs of the second annular portion being itself strictly less than the mean height of the ribs of the third annular portion.

As a preference, within said tire 1, the first annular portion comprises, predominantly, and preferably exclusively, ribs the height of which is comprised between 0.05 mm and 0.25 mm, and the width of which is comprised between 0.4 and 1.5 mm, and which are arranged in a hexagonal first pattern M31 that repeats with a first repeat pitch P31 comprised between 2 mm and 15 mm, whereas the second annular portion comprises, predominantly, and preferably exclusively, ribs the height of which is greater than the height of the ribs of the first annular portion and comprised between 0.25 mm and 0.45 mm, and the width of which is comprised between 0.4 and 1.5 mm, and which are arranged in a hexagonal second pattern M32 that repeats with a second repeat pitch P32 comprised between 2 mm and 15 mm, preferably equal to the first repeat pitch P31, and the third annular portion comprises, predominantly, and preferably exclusively, ribs the height of which is greater than the height of the ribs of the second annular portion and comprised between 0.45 mm and 1.2 mm, and the width of which is comprised between 0.4 mm and 2 mm, and which are arranged in a hexagonal third pattern M33 that repeats with a third repeat pitch P33 equal to or greater than the second repeat pitch P32 and comprised between 4 mm and 40 mm, or else, preferably, between 6 mm and 30 mm, or in a third pattern M33 of parallel straight bands which repeats at a third repeat pitch P33 strictly greater than the second repeat pitch P32 and comprised between 4 mm and 40 mm, or else preferably between 6 mm and 30 mm.

Just as indicated above, the tire 1 may also have a hybrid boundary region providing the transition between the second and the third annular portion and corresponding to the negative of the boundary region 33A which, on the curing membrane 2, forms the transition between the second and third drainage region 32, 33.

The disclosure finally relates to a curing membrane 2 per se, which is intended for the manufacture of a tire 1 comprising a crown region 11, a bead region 13, and a sidewall region 12.

As indicated above, said curing membrane 2 is provided with a drainage structure 30 which comprises air-discharge paths cut into the contact surface to a depth equal to or greater than 0.05 mm and referred to as "channels" C31, C32, C33.

According to the disclosure, said curing membrane 2 is such that, at least in the northern hemisphere 4N, and preferably symmetrically in the northern hemisphere 4N and in the southern hemisphere 4S, there may be defined a first parallel P1, distinct from the equatorial line EQ_2 and corresponding to the intersection of the contact surface 4 with a first plane parallel to the equatorial plane P_EQ, and a second parallel P2 which is situated between the first parallel P1 and the corresponding foot 24 and which corresponds to the intersection of the contact surface 4 with a second plane parallel to the equatorial plane P_EQ so that the drainage structure 30 comprises a first drainage region 31 corresponding to that portion of the contact surface 4 that is delimited by the equatorial line EQ_2 and the first parallel P1, and wherein the channels C31 have a first mean depth, a second drainage region 32, which corresponds to that portion of the contact surface 4 that is delimited by the first parallel P1 and the second parallel P2, and wherein the channels C32, which communicate with the channels C31 of the first drainage region 31, have a second mean depth, strictly greater than the first mean depth of the channels C31 of the first drainage region 31, and a third drainage region 33, which corresponds to that portion of the contact surface 4 that is delimited by the second parallel P2 and the foot 24 that forms the corresponding pole, and wherein the channels C33, which communicate with the channels C32 of the second drainage region 32, have a third mean depth, strictly greater than the second mean depth of the channels C32 of the second drainage region 32.

Of course, the channels C31, C32, C33 may adopt any shape and/or dimension that can be derived from the foregoing description.

In particular, the curing membrane 2 may comprise a hybrid boundary region 33A providing a progressive transition between the second drainage region 32, which preferably comprises exclusively channels C32 according to the second pattern M32, and the third drainage region 33.

It will also be noted that, as a preference, in order to reconcile endurance with elasticity, the curing membrane 2 will, at rest, as is visible in FIG. 1A, have a portion of greater thickness T33 in the vicinity of each of its feet 24, 25, in which portion the thickness T33 of the curing membrane 2 is greater than the thickness, referred to as the "simple thickness" T31, that this same curing membrane 2 exhibits in the vicinity of the equatorial line EQ_2.

As a preference, the transition between the greater thickness T33 and the simple thickness T31 will be situated in line with the second parallel P2 which marks the boundary between the second drainage region 32 and the third drainage region 33.

Advantageously, this makes it possible to avoid excessive elongation of those portions of the curing membrane 2 that engage with the bead regions 13, 13' of the tire 1, and to encourage elastic extension of the curing membrane 2 in those portions that press against the crown region 11 and the sidewall regions 12, 12' of the tire 1. Furthermore, that allows the bead regions 13, 13' to be pressed intimately against the mold 7 effectively so as to obtain good control of the manufacture of said bead regions 13, 13', which are particularly important in transmitting torque between the rim and the tire 1 and to the airtight sealing of the tire 1 to the rim.

By way of indication, the greater thickness T33 may be comprised between 6 mm and 9 mm, for example equal to 7 mm, whereas the simple thickness T31 may be comprised between 4 mm and 6 mm, for example equal to 5 mm.

More generally, whatever the arrangement adopted, the at-rest thickness of the curing membrane 2 will preferably be comprised between 4 mm and 15 mm.

Bearing in mind the symmetrical layout of the tire 1 and of the curing membrane 2 with respect to the equatorial plane P_EQ, the first drainage region 31 will preferably extend continuously, without any interruption of the first family of channels C31, on each side of the equatorial line EQ_2, while the curing membrane 2 will have two annular second drainage regions 32, 32' situated one on each side of this single central first drainage region 31, one in the northern hemisphere 4N and the other in the southern hemisphere 4S, followed by two annular third drainage regions 33, 33' which, likewise, each meet up with an opposite foot 24, 25 and, therefore, pole.

Through simple convenience of notation, numerical references that are analogous, although suffixed with a "prime" symbol, will be used to denote elements of the southern hemisphere 4S that are homologous with, and particularly symmetrical to, elements of the northern hemisphere 4N, such as the first parallel P1' and second parallel P2' or even third parallel P3', or the second and third drainage regions 32', 33'.

Of course, the disclosure is in no way limited only to the embodiment variants described in the preceding text, a person skilled in the art being notably capable of isolating or freely combining one or another of the abovementioned features with one another, or of substituting equivalents therefor.

In particular, it will be noted that the various families of channels C31, C32, C33 may extend over regions of the contact surface 4 of which the boundaries do not exactly follow the parallels but are, for example, inclined with respect to a parallel or undulate about a parallel, provided that it remains possible, even if virtually, to define, on said contact surface 4, annular drainage regions 31, 32, 33 within the meaning of the disclosure which are delimited by parallels and within which, on average, and despite the presence and coexistence, in at least one of said annular drainage regions, of channels C31, C32, C33 belonging to different families and therefore having different depths, it is possible to calculate and observe a mean depth which meets the aforementioned criterion whereby the mean depth of the first drainage region 31 is strictly less than the mean depth of the second drainage region 32, which is itself strictly less than the mean depth of the third drainage region 33.

However, as indicated above, it will be preferable for the material boundaries demarcating the various families of channels C31, C32, C33 to coincide with the parallels P1, P2 that form the boundaries of the drainage regions 31, 32, 33.

What is claimed is:

1. A method for curing a tire, during which a curing membrane is deployed against a green tire in order to bring a contact surface of said curing membrane to bear against an interior surface of said green tire and thus press an exterior surface of said green tire against the walls of a curing mold so as to obtain a tire which has a crown region forming an annular tread around a central axis, and, on each side of an equatorial plane normal to said central axis, a bead region for securing said tire to a rim, and a sidewall region connecting the crown region to the bead region, the method further comprising the contact surface of the curing membrane is provided with a drainage structure which comprises air-discharge path channels cut into the contact surface to a depth equal to or greater than 0.05 mm, wherein said drainage structure is subdivided, at least on one side of the equatorial plane, into at least three drainage regions, these being a first drainage region which corresponds to a first annular portion of the contact surface, centered on the central axis, along which said contact surface will hug the crown region, a second drainage region which corresponds to a second annular portion of the contact surface, centered on the central axis, along which said contact surface will hug the sidewall region and the channels of which communicate with the channels of the first drainage region, and a third drainage region which corresponds to a third annular portion of the contact surface, centered on the central axis, along which said contact surface will hug the bead region and the channels of which communicate with the channels of the second drainage region, and a mean depth of the channels of the third drainage region, which is equal to a quotient of a volume occupied by the channels present in said drainage region by a surface area covered by these same channels in said drainage region is strictly greater than a mean depth of the channels of the second drainage region, said mean depth of the channels of the second drainage region being itself strictly greater than a mean depth of the channels of the first drainage region, and wherein all the channels of the first drainage region are a first family of channels formed by a repeating hexagonal pattern that extend continuously along a full length of the first drainage region including to the equatorial plane, wherein at least 50% of the channels of the first drainage region have a constant depth which is comprised between 0.05 mm and 0.25 mm.

2. The method according to claim 1, wherein a boundary between the first drainage region and the second drainage region follows a first parallel line along which the normal to the interior surface of the tire is inclined, with respect to the central axis, by a first declination angle which is comprised between 40 degrees and 85 degrees.

3. The method according to claim 2, wherein the first declination angle is between 45 degrees and 85 degrees.

4. The method according to claim 3, wherein the first declination angle is between 50 degrees and 80 degrees.

5. The method according to claim 1, wherein a boundary between the second drainage region and the third drainage region follows a second parallel line along which the normal to the interior surface of the tire forms, with respect to the central axis, a second declination angle which is comprised between zero degrees and 30 degrees.

6. The method according to claim 1, wherein the mean depth of the channels in the first drainage region is comprised between 0.05 mm and 0.25 mm.

7. The method according to claim 1, wherein the mean depth of the channels in the second drainage region is comprised between 0.25 mm and 0.45 mm.

8. The method according to claim 1, wherein at least 50% of the channels of the second drainage region have a constant depth which is comprised between 0.25 mm and 0.45 mm.

9. The method according to claim 8, wherein at least 50% of the channels of the third drainage region have a constant depth which is comprised between 0.45 mm and 1.20 mm.

10. The method according to claim 9, wherein at least 80% of the channels of the third drainage region have the constant depth which is comprised between 0.45 mm and 0.60 mm.

11. The method according to claim 8, wherein at least 80% of the channels of the second drainage region have the constant depth which is comprised between 0.25 mm and 0.45 mm.

12. The method according to claim 1, wherein the mean depth of the channels in the third drainage region is comprised between 0.45 mm and 1.20 mm.

13. The method according to claim 1, wherein the first drainage region comprises the first family of channels have a depth comprised between 0.05 mm and 0.25 mm, a width comprised between 0.4 mm and 1.5 mm, and a first repeat pitch comprised between 2 mm and 15 mm.

14. The method according to claim 1, wherein the second drainage region comprises a second family of channels which are formed by repeating a second hexagonal pattern which gives the channels of said second family a depth comprised between 0.25 mm and 0.45 mm, a width comprised between 0.4 mm and 1.5 mm, and a second repeat pitch comprised between 2 mm and 15 mm.

15. The method according to claim 1, wherein the third drainage region comprises a third family of channels which are formed by repeating a third pattern in parallel straight bands which gives the channels of said third family a depth comprised between 0.45 mm and 1.20 mm, a width comprised between 0.4 mm and 2 mm, and a repeat pitch comprised between 4 mm and 40 mm.

16. The method according to claim 1, wherein at least 80% of the channels of the first drainage region have the constant depth which is comprised between 0.05 mm and 0.25 mm.

17. The method according to claim 1, wherein the curing membrane has a portion of greater thickness in a vicinity of each of its feet and has a simple thickness, which is less than the greater thickness, in a vicinity of the equatorial plane.

18. A tire obtained by a method according to claim 1, said tire thus having on its interior surface three distinct annular portions, centered on the central axis of the tire, which are situated, on the one same side of the equatorial plane, respectively beneath the crown region thereof, beneath the sidewall region thereof, and beneath the bead region thereof, and which contain ribs of a height equal to or greater than 0.05 mm, which correspond to the respective impressions, in negative, of the channels of the distinct first, second and third drainage regions, and which are dimensioned in such a way that a first annular portion has a mean rib height strictly less than a mean height of the ribs of a second annular portion, said mean height of the ribs of the second annular portion being itself strictly less than a mean height of the ribs of a third annular portion.

19. The tire according to claim 18, wherein the first annular portion comprises ribs the height of which are comprised between 0.05 mm and 0.25 mm, and a width of which are comprised between 0.4 and 1.5 mm, and which are arranged in a hexagonal first pattern that repeats with a first repeat pitch comprised between 2 mm and 15 mm, the second annular portion comprises ribs the height of which are greater than the height of the ribs of the first annular portion and comprised between 0.25 mm and 0.45 mm, and a width of which are comprised between 0.4 and 1.5 mm, and which are arranged in a hexagonal second pattern that repeats with a second repeat pitch comprised between 2 mm and 15 mm, equal to the first repeat pitch, and the third annular portion comprises ribs the height of which are greater than the height of the ribs of the second annular portion and comprised between 0.45 mm and 1.2 mm, and a width of which are comprised between 0.4 mm and 2 mm, and which are arranged either in a hexagonal third pattern that repeats with a third repeat pitch equal to or greater than the second repeat pitch and comprised between 4 mm and 40 mm or in a third pattern of parallel straight bands which repeats at a third repeat pitch strictly greater than the second repeat pitch and comprised between 4 mm and 40 mm.

* * * * *